(12) United States Patent
Suzuki et al.

(10) Patent No.: US 12,516,960 B2
(45) Date of Patent: Jan. 6, 2026

(54) STROKE SENSOR AND STROKE SENSOR ASSEMBLY HAVING THE SAME

(71) Applicant: TDK Corporation, Tokyo (JP)

(72) Inventors: Keiji Suzuki, Tokyo (JP); Tatsuya Kato, Tokyo (JP)

(73) Assignee: TDK Corporation, Tokyo (JP)

( * ) Notice: Subject to any disclaimer, the term of this patent is extended or adjusted under 35 U.S.C. 154(b) by 157 days.

(21) Appl. No.: 18/506,535

(22) Filed: Nov. 10, 2023

(65) Prior Publication Data
US 2024/0192027 A1    Jun. 13, 2024

(30) Foreign Application Priority Data
Dec. 13, 2022  (JP) ................................ 2022-198766

(51) Int. Cl.
*G01D 5/16* (2006.01)

(52) U.S. Cl.
CPC ........... *G01D 5/16* (2013.01); *G01D 2205/14* (2021.05)

(58) Field of Classification Search
CPC ........... G01D 5/12; G01D 5/14; G01D 5/142; G01D 5/145; G01D 5/16; G01D 2205/10; G01D 2205/14
See application file for complete search history.

(56) References Cited

U.S. PATENT DOCUMENTS

| | | | |
|---|---|---|---|
| 2001/0033160 A1* | 10/2001 | Glasson | G01D 11/245 324/207.2 |
| 2008/0204006 A1* | 8/2008 | Wolschlager | G01D 5/145 324/207.24 |
| 2009/0066322 A1* | 3/2009 | Shintani | G01D 5/04 324/207.24 |
| 2010/0207618 A1* | 8/2010 | Erickson | G01P 3/50 324/228 |
| 2012/0038351 A1* | 2/2012 | Saruki | G01D 5/145 324/207.25 |
| 2020/0072639 A1* | 3/2020 | Riehl | G01D 5/04 |
| 2021/0079938 A1* | 3/2021 | Yasui | F16H 25/2015 |
| 2021/0293577 A1* | 9/2021 | Ishikawara | G01D 11/30 |

FOREIGN PATENT DOCUMENTS

JP    H01-165413 U    11/1989

* cited by examiner

*Primary Examiner* — Raul J Rios Russo
*Assistant Examiner* — David B Frederiksen
(74) *Attorney, Agent, or Firm* — Posz Law Group, PLC

(57) ABSTRACT

Stroke sensor 3 for detecting a position of moving object 2 that moves linearly has: magnetic field generator 11; support member 7 that supports magnetic field generator 11; and magnetic field detecting element 14 that detects a magnetic field that is generated by magnetic field generator 11. Support member 7 converts a linear movement of moving object 2 relative to magnetic field detecting element 14 to a rotational movement of magnetic field generator 11 relative to magnetic field detecting element 14. Magnetic field generator 11 moves rotationally in a rotational movement range having two ends, and a one-to-one correspondence is realized between a rotation angle of magnetic field generator 11 and a position of moving object 2 within a region of the rotational movement range that excludes at least the two ends.

11 Claims, 6 Drawing Sheets

STROKE SENSOR AND STROKE SENSOR ASSEMBLY HAVING THE SAME

FIELD

The present application is based on and claims priority from JP2022-198766 filed on Dec. 13, 2022, the disclosure of which is hereby incorporated by reference herein in its entirety.

The present disclosure relates to a stroke sensor and a stroke sensor assembly having the same.

BACKGROUND

A stroke sensor that detects the position of a moving object that moves linearly is known. JPU1-165413 discloses a stroke sensor having a potentiometer and a rotation shaft that is attached to the potentiometer. An arm portion that extends in a direction perpendicular to the rotation shaft is attached to the rotation shaft, and the arm portion engages with a guide groove that is provided in the moving object. The guide groove has a sinusoidal shape that is longer than half the wavelength thereof. The movement of the moving object causes the arm portion to bring about rotation of the rotation shaft. The resistance of the potentiometer changes in proportion to the rotation angle of the rotation shaft. The rotation angle of the rotation shaft is detected by the change in the resistance and the position of the moving object is thereby detected.

SUMMARY

A stroke sensor of the present disclosure detects a position of a moving object that moves linearly. The stroke sensor comprises: a magnetic field generator; a support member that supports the magnetic field generator; and a magnetic field detecting element that detects a magnetic field that is generated by the magnetic field generator. The support member converts a linear movement of the moving object relative to the magnetic field detecting element to a rotational movement of the magnetic field generator relative to the magnetic field detecting element. The magnetic field generator moves rotationally in a rotational movement range having two ends, and a one-to-one correspondence is realized between a rotation angle of the magnetic field generator and a position of the moving object within a region of the rotational movement range that excludes at least the two ends.

The above and other objects, features and advantages of the present disclosure will become apparent from the following description with reference to the accompanying drawings that illustrate examples of the present disclosure.

BRIEF DESCRIPTION OF THE DRAWINGS

Accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
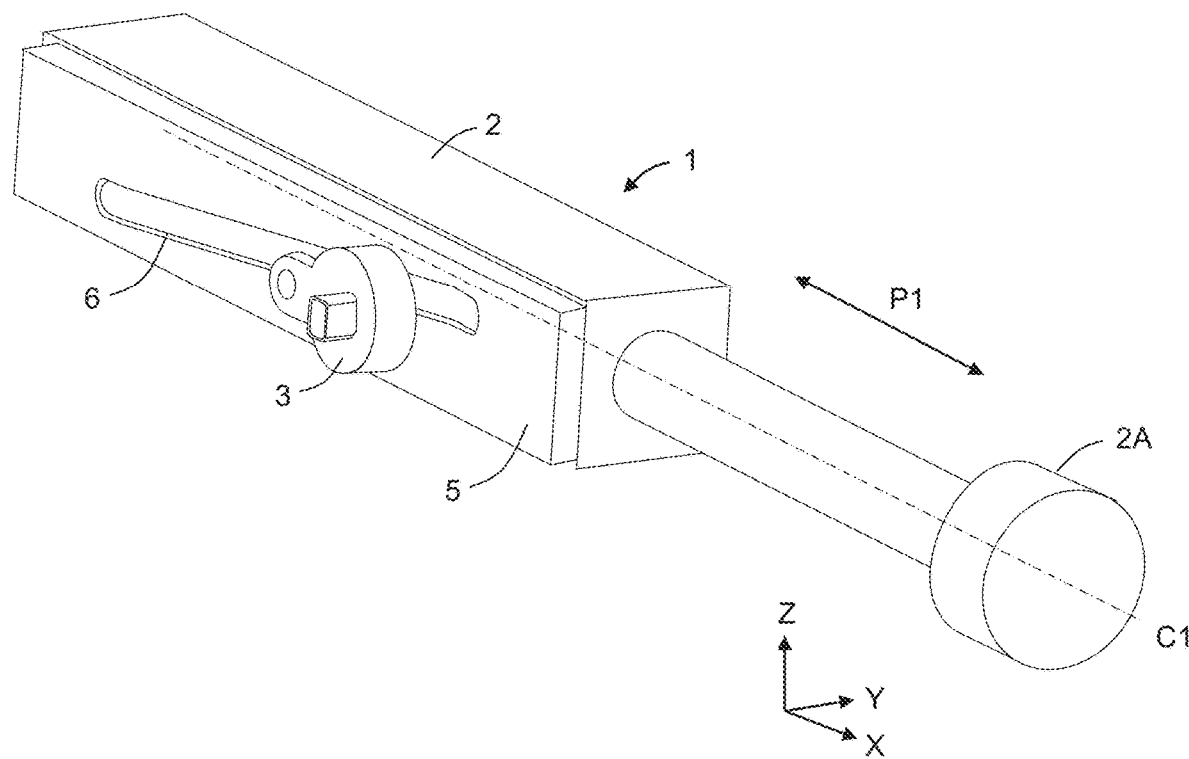
FIG. 1 is a schematic perspective view of a stroke sensor assembly according to a first example embodiment of the present disclosure.

In the following, some example embodiments and modification examples of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions.

The stroke sensor disclosed in JPU1-165413 can detect the position of a moving object having a large range of movement. However, since the guide groove has a sinusoidal shape that is longer than half of the wavelength thereof, a one-to-one correspondence is not always realized between the position of the moving object and the rotation angle of the arm portion. In other words, the position of the moving object cannot always be determined by the output of the potentiometer.

According to the present disclosure, it is possible to provide a stroke sensor having improved performance in detecting the position of a moving object that has a large range of movement.

Embodiments of the stroke sensor assembly and the stroke sensor of the present disclosure will be described with reference to the drawings. Stroke sensor assembly 1 and stroke sensor 3 of the present embodiments are not limited in use and may be applied to vehicles such as automobiles and motorcycles and to industrial machines and is particularly applicable to the detection of the position of a moving object having a large range of movement. In the following descriptions and drawings, the X-direction refers to the direction of movement of moving object 2. The Y-direction refers to a direction perpendicular to the surface on which guide path P3 is provided and is perpendicular to the X-direction. The Z-direction refers to the direction perpendicular to the X-direction and the Y-direction. In the following descriptions, the term "relative movement" is used, and the identity of the element that moves is judged according to the context. For example, the sentence "element A moves relative to element B" is interpreted to mean that element B moves when element A is fixed and to mean that element A moves when element B is fixed.

Figure 2:
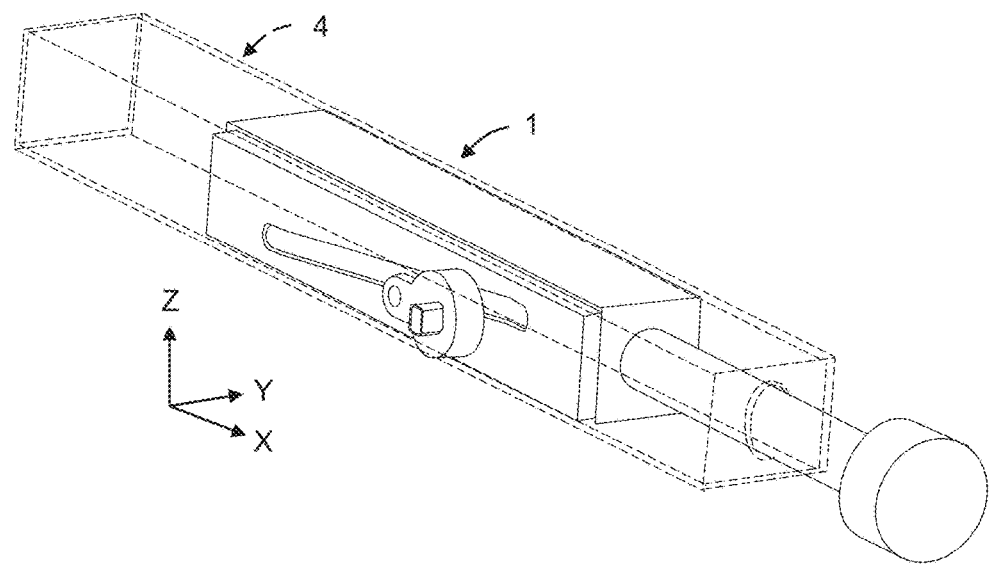
FIG. 2 is a schematic perspective view of the stroke sensor assembly shown in FIG. 1 and a container of the moving object.

FIG. 1 shows a schematic perspective view of stroke sensor assembly 1, and FIG. 2 shows a schematic perspective view of stroke sensor assembly 1 and container 4 of stroke sensor assembly 1. Stroke sensor assembly 1 has moving object 2 that moves linearly and stroke sensor 3 that detects the position of moving object 2. As shown in FIG. 2, moving object 2 is housed in container 4 such as a housing and can slide in container 4 in the X-direction. In other words, moving object 2 has first linear path P1 that is parallel to the X-direction and moving object 2 moves along first linear path P1 in the X-direction. Container 4 is fixed to the main body (not illustrated) of a vehicle or a machine. First linear path P1 substantially coincides with center line C1 of moving object 2 along the X-direction. One end 2A of moving object 2 is provided outside container 4 and is connected to a driving means (not illustrated). Most of stroke sensor 3 is provided outside container 4. Guide plate 5 having slot 6 is fixed to the surface of moving object 2 that faces stroke sensor 3, and as described later, stroke sensor 3 is connected to moving object 2 by slot 6.

Figure 3A:
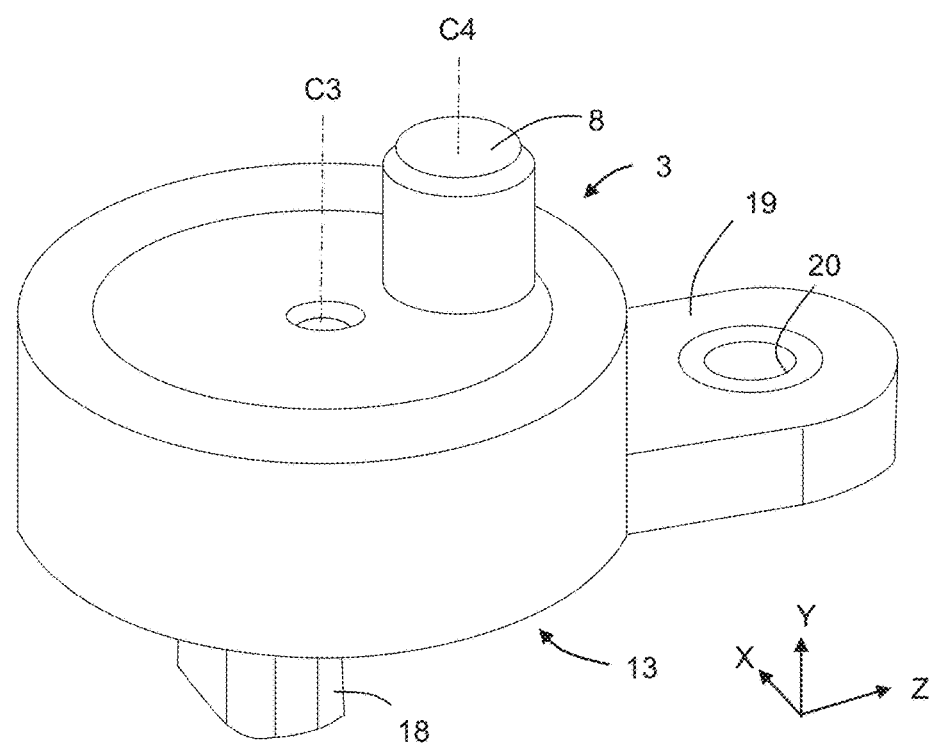
FIG. 3A is a schematic perspective view of a support member and an element mounting portion of the stroke sensor assembly shown in FIG. 1.
Figure 3B:
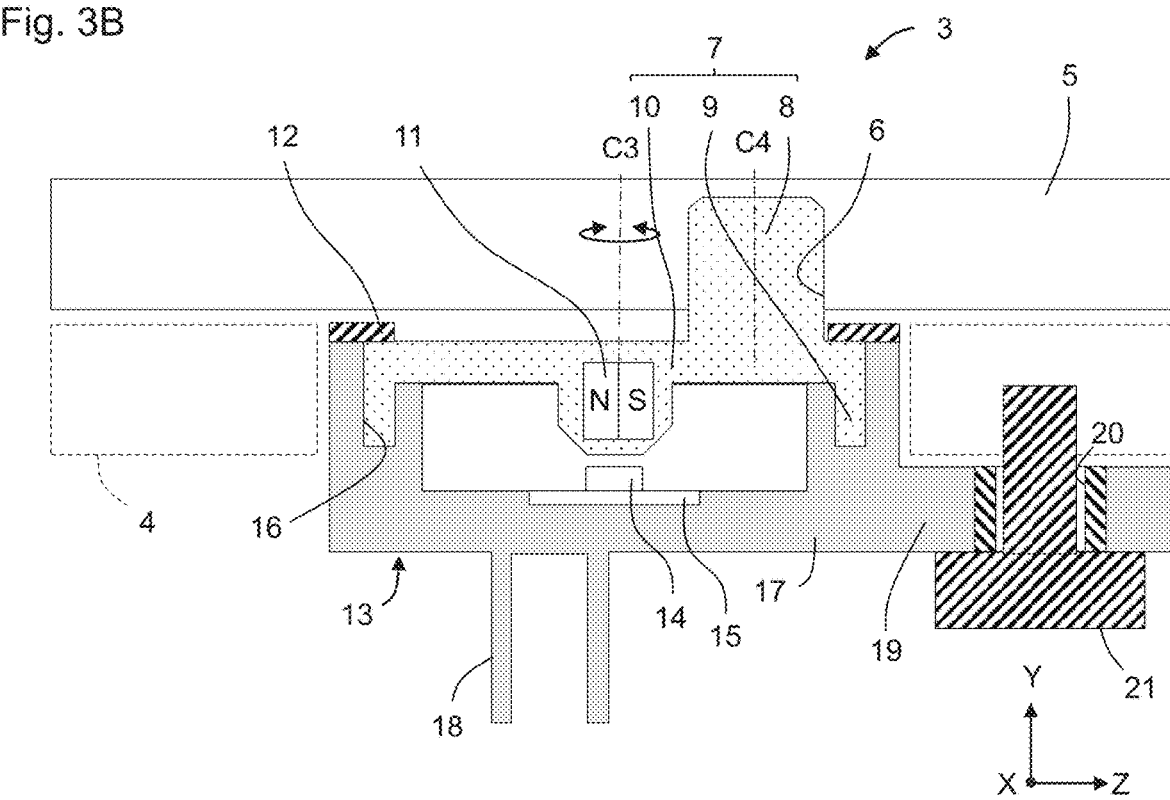
FIG. 3B is a schematic cross-sectional view of the support member and the element mounting portion of the stroke sensor assembly shown in FIG. 1.

FIG. 3A shows a schematic perspective view of stroke sensor 3, and FIG. 3B shows a schematic cross-sectional view of stroke sensor 3. Stroke sensor 3 has support member 7 that supports magnetic field generator 11 and element mounting portion 13 that is provided with magnetic field detecting element 14. Magnetic field generator 11 is a magnet in which the N-pole and the S-pole are formed on the surface of the magnet facing magnetic field detecting element 14. Support member 7 can rotate about rotation axis C3 that is parallel to the Y-direction.

Figure 4A:
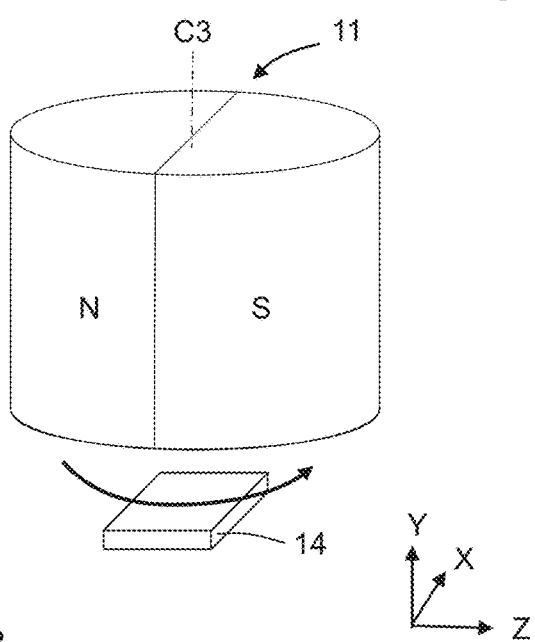
FIGS. 4A-4C are schematic views showing the arrangement of a magnetic field generator of the stroke sensor assembly shown in FIG. 1.
Figure 4C:
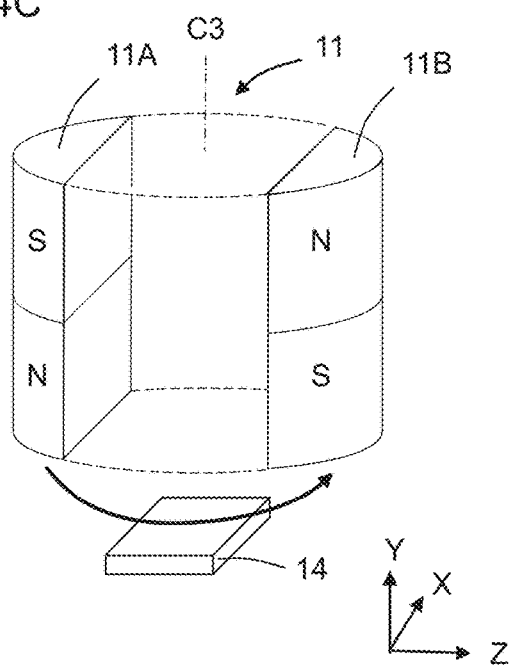
Figure 4B:
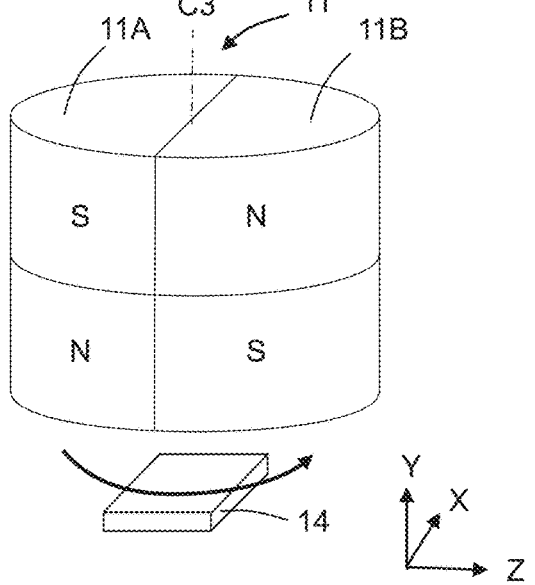

FIGS. 4A to 4C show various arrangements of magnetic field generator 11. The bold arrow lines in the figures conceptually show the magnetic flux that is generated by magnetic field generator 11. FIG. 4A shows a perspective view of magnetic field generator 11 shown in FIG. 3B. Magnetic field generator 11 is a cylindrical magnet that is coaxial with rotation axis C3 of the rotational movement of support member 7 and has only one N-pole and one S-pole about rotation axis C3. The magnet is easily thinned in the Y-direction because the magnet is magnetized in the Z-direction. FIG. 4B shows a perspective view of magnetic field generator 11 according to a modification. Magnetic field generator 11 has a pair of semi-cylindrical magnets 11A and 11B that are in contact with each other, and magnets 11A and 11B are arranged in rotational symmetry with regard to rotation axis C3 of the rotational movement. The surfaces of magnets 11A and 11B that face magnetic field detecting element 14 have different polarities. This arrangement facilitates reduction of the size of the magnets in the X-Z plane. FIG. 4C shows a perspective view of magnetic field generator 11 according to another modification. Magnetic field generator 11 has a pair of magnets 11A and 11B that are separated from each other, and magnets 11A and 11B are arranged in rotational symmetry with regard to rotation axis C3 of the rotational movement. The surfaces of magnets 11A and 11B that face magnetic field detecting element 14 have different polarities. This arrangement can reduce the volume of the magnets. Although not illustrated, magnets 11A and 11B may be rectangular parallelepipeds, an arrangement that facilitates reduction of the cost of the magnet as compared to magnets that are formed with curved surfaces. Two pairs or more of the magnets may be provided in the modifications shown in FIGS. 4B and 4C.

Support member 7 is formed of resin or nonmagnetic metal and is integrated with magnetic field generator 11 by suitable means such as engaging, bonding, or insert molding. Alternatively, support member 7 and magnetic field generator 11 may be integrated using a plastic magnet. Support member 7 has first guide portion 8 that engages with groove 6 and that is guided by groove 6, second guide portion 9 that engages with groove 16 of element mounting portion 13, and circular plate portion 10 that is positioned between first guide portion 8 and second guide portion 9. Circular plate portion 10 connects first guide portion 8 to second guide portion 9. The center of circular plate portion 10 coincides with rotation axis C3 of support member 7. First guide portion 8 is a substantially cylindrical element. Central axis C4 of first guide portion 8 is eccentric from the center of circular plate portion 10 or rotation axis C3 of support member 7. Second guide portion 9 is an annular protrusion that extends along the circumference of circular plate portion 10, and the central axis of second guide portion 9 coincides with rotation axis C3 of support member 7. Second guide portion 9 has the same section as groove 16 and rotates along groove 16.

Element mounting portion 13 is formed of resin or nonmagnetic metal and is secured to container 4. Element mounting portion 13 may alternatively be secured to the main body (not illustrated) of the vehicle or the machine. Element mounting portion 13 has substantially cylindrical main portion 17, connecting portion 18 that connects signal lines from magnetic field detecting element 14 to outside stroke sensor 3, and fixing portion 19 for securing element mounting portion 13. Main portion 17, connecting portion 18 and fixing portion 19 are formed integrally. Main portion 17 has annular groove 16 that guides second guide portion 9. Groove 16 defines rotational movement range P2 (see FIG. 7). Support member 7 can rotate about rotation axis C3 relative to element mounting portion 13 or to magnetic field detecting element 14 via groove 16. Fixing portion 19 has bushing 20 through which attachment bolt 21 is inserted. The surfaces of support member 7 and element mounting portion 13 that face moving object 2 or guide plate 5 are covered with ring-shaped protection element 12.

Magnetic field detecting element 14 detects a magnetic field that is generated by magnetic field generator 11. The arrangement of magnetic field detecting element 14 is not particularly limited and may employ a magneto-resistive effect element (for example, an anisotropic magneto resistance (AMR) element, a tunnel magneto resistance (TMR) element, or a giant magnetoresistance (GMR) element) or a Hall element. Magnetic field detecting element 14 is mounted on substrate 15 and receives signals from the outside and sends signals to the outside via substrate 15. Magnetic field detecting element 14 detects magnetic fields in the X-direction and in the Z-direction that are formed by magnetic field generator 11 and detects its position relative to magnetic field generator 11 based on the angle of the combined magnetic field of these magnetic fields.

Figure 5:
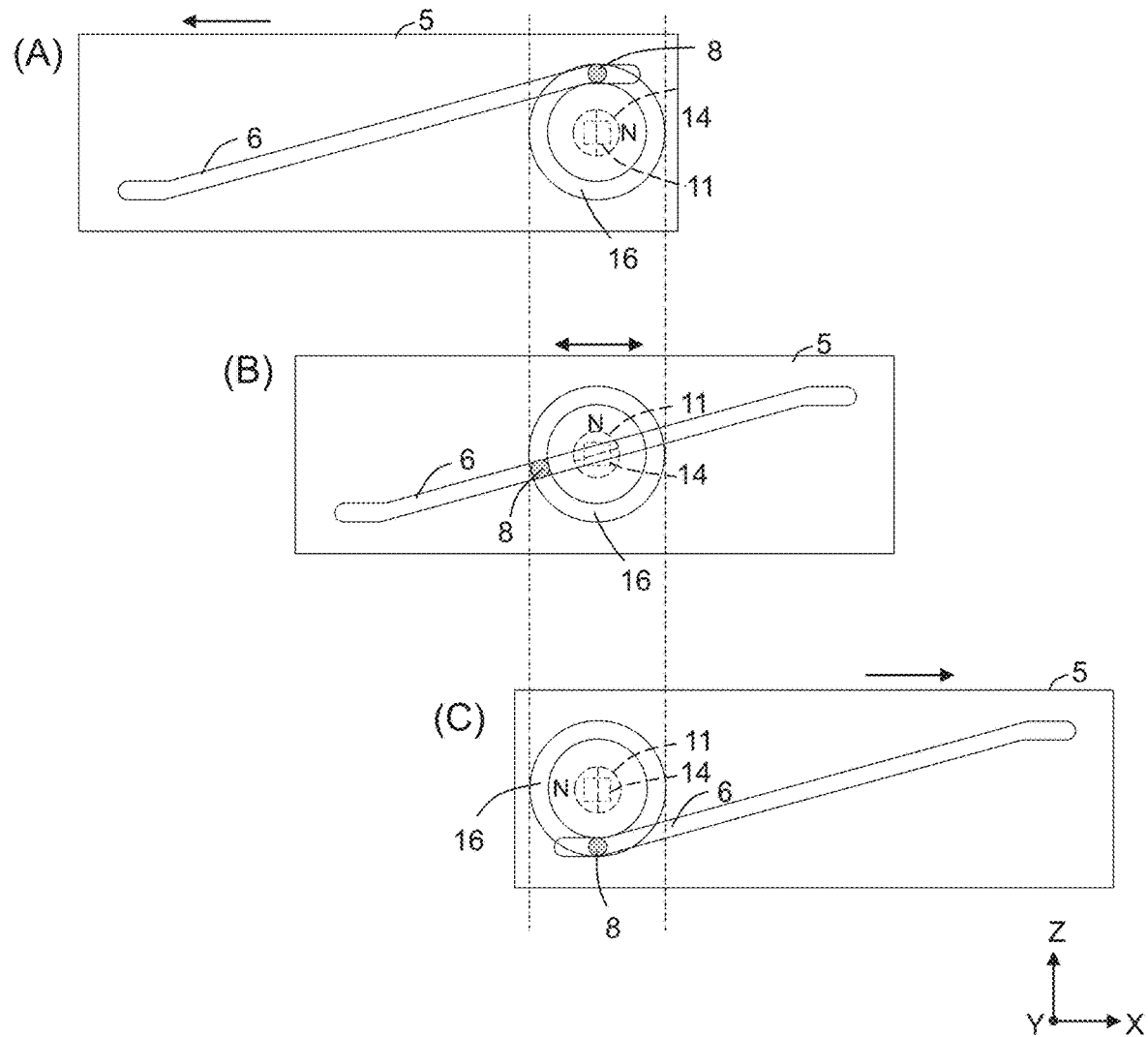
FIGS. 5 and 6 are conceptual views each showing the relative movement of the stroke sensor and the moving object of the stroke sensor assembly shown in FIG. 1.
Figure 6:
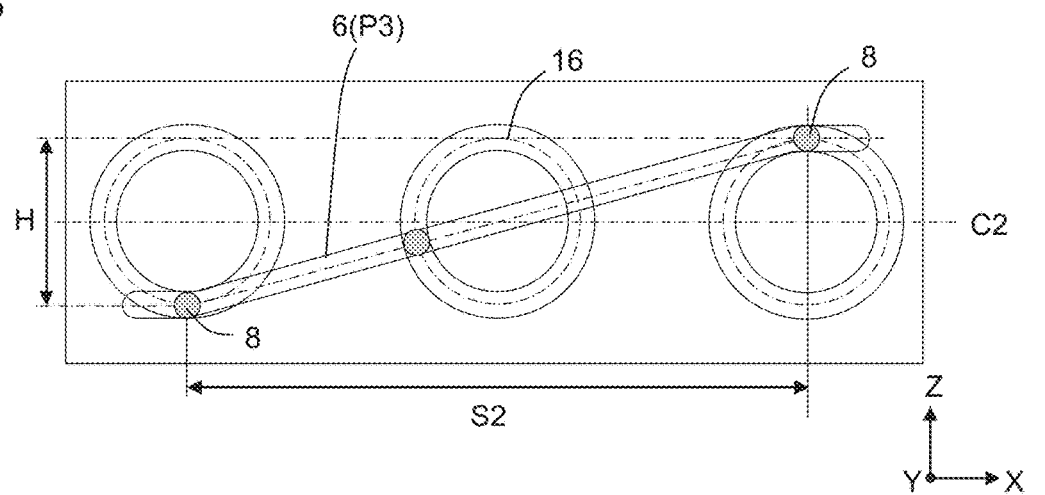
Figure 7:
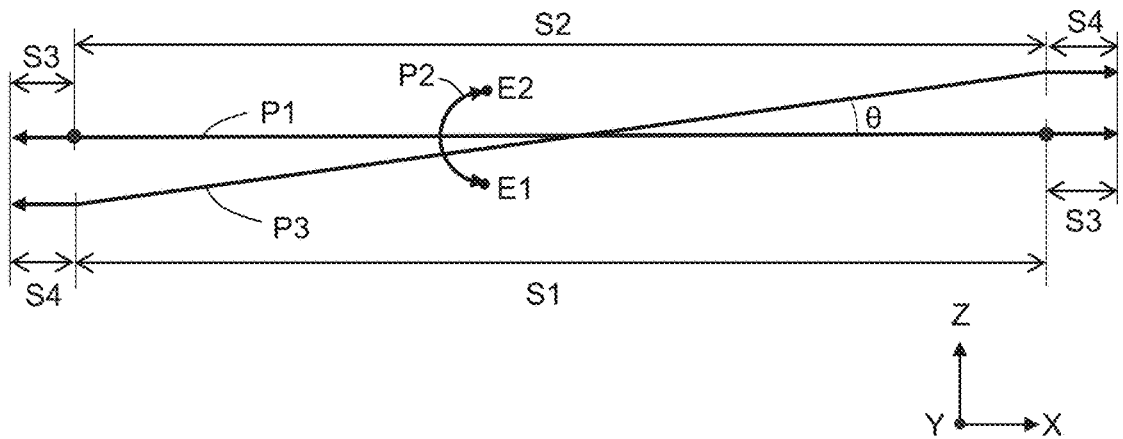
FIG. 7 is a conceptual view showing a linear path and a guide path of the moving object and the rotational movement range of the support member of the stroke sensor assembly shown in FIG. 1.

FIG. 5 shows the manner in which moving object 2 (guide plate 5) moves relative to stroke sensor 3. In FIG. 5, the position of stroke sensor 3 is indicated by magnetic field generator 11, magnetic field detecting element 14, and groove 16. The position of stroke sensor 3 is fixed in the X-direction. Referring to part (A) of FIG. 5, stroke sensor 3 is positioned at the right end of correspondence section S2 of groove 6 (see FIG. 7). Referring to part (B) of FIG. 5, stroke sensor 3 is positioned at the center of correspondence section S2 of groove 6. Referring to part (C) of FIG. 5, stroke sensor 3 is positioned at the left end of correspondence section S2 of groove 6. FIG. 6 is a view similar to FIG. 5 but for convenience is illustrated such that moving object 2 is fixed and stroke sensor 3 moves. FIG. 7 is a conceptualized view of FIG. 6 in which linear path P1, rotational movement range P2, and guide path P3 are shown by their center lines.

As described above, moving object 2 has groove 6. Groove 6 forms guide path P3 that guides support member 7, and support member 7 moves along groove 6 relative to moving object 2. Normally, moving object 2 moves in the X-direction in a specific range (hereinafter, referred to as normal movement section S1). Accordingly, first guide portion 8 of support member 7 engages with groove 6 in a section corresponding to normal movement section S1 and rotational movement range P2 (described later) (hereinafter referred to as correspondence section S2). As will be described later, groove 6 has additional sections S4 outside correspondence section S2, but first guide portion 8 normally does not enter additional sections S4. In correspondence section S2, guide path P3 linearly extends in the X-Z plane in a direction that is slightly tilted with respect to the X-axis. Guide path P3 is not limited to a linear line and may be, for example, sinusoidal, but from the viewpoint of the processing cost of groove 6 may be made linear. The length of normal movement section S1 of moving object 2 depends on the application of stroke sensor assembly 1 but is in the range of tens of millimeters for a short section length and is in the range of hundreds of millimeters for a long section length. The width of groove 6 is constant over the entire length and is set to be slightly larger than the diameter of first guide portion 8.

Stroke sensor 3 operates as follows: Moving object 2 first moves in the X-direction, and because element mounting portion 13 of stroke sensor 3 is fixed, the movement of moving object 2 in the X-direction is equivalent to the movement in the X-direction relative to element mounting portion 13 or magnetic field detecting element 14. This relative movement is a linear movement, and the linear movement of moving object 2 is made along linear path P1 that is parallel to the X axis.

Support member 7 or magnetic field generator 11 of stroke sensor 3 moves along groove 6 relative to moving object 2. Thus, support member 7 of stroke sensor 3 moves relative to moving object 2 in two directions, i.e., in the X- and Z-directions. However, since second guide portion 9 is restricted by groove 16 of element mounting portion 13, support member 7 or magnetic field generator 11 rotates relative to element mounting portion 13 or magnetic field detecting element 14. The rotational movement is made along rotational movement range P2 that is defined by groove 16. Rotational movement range P2 is the movable range of first guide portion 8. Rotational movement range P2 is substantially semi-circular and is a part of groove 16. In this manner, support member 7 converts the linear movement of moving object 2 relative to magnetic field detecting element 14 to a rotational movement of magnetic field generator 11 relative to magnetic field detecting element 14. This rotational movement is a circular movement about rotation axis C3 that passes through magnetic field detecting element 14 and is perpendicular to the magnetic field detection directions (the X- and Z-directions) of magnetic field detecting element 14.

If magnetic field detecting element 14 and magnetic field generator 11 were provided along linear path P1, the intensity of the magnetic field of magnetic field generator 11 would have to be increased in order to obtain the necessary intensity of the magnetic field over the entire length of normal movement section S1 along linear path P1. However, this arrangement would lead to an increase in the size of magnetic field generator 11 and a consequent increase in the cost of stroke sensor 3. In the present embodiment, the linear movement of moving object 2 along linear path P1 is converted to a rotational movement of first guide portion 8 along rotational movement range P2. Magnetic field generator 11 only rotates without moving in the X-direction, Thus, an increase in the size of magnetic field generator 11 and an increase in the cost of stroke sensor 3 can be limited.

Guide path P3 has at least one additional section S4 that is connected to correspondence section S2 of moving object 2 outside correspondence section S2. In the present embodiment, additional sections S4 are provided on both sides of correspondence section S2. The two additional sections S4 have the same length but may alternatively have different lengths. Sections S3 that correspond to additional sections S4 are also provided on both sides of normal movement section S1 of linear path P1. The section consisting of normal movement section S1 and two sections S3 corresponds to the range in which moving object 2 can physically move.

First guide portion 8 of support member 7 normally does not enter additional sections S4 because additional sections S4 are positioned outside correspondence section S2. However, if there are no additional sections S4, first guide portion 8 and groove 6 may suffer damage if for any reason first guide portion 8 moves beyond correspondence section S2. In addition, first guide portion 8 may be moved beyond correspondence section S2 for inspection or adjustment in the manufacturing process of stroke sensor 3. In these cases, additional sections S4 can accommodate first guide portion 8. When first guide portion 8 is likely to move only to one side beyond correspondence section S2 during operation or in the manufacturing process, only one additional section S4 may be provided on one side of correspondence section S2.

Figure 8A:
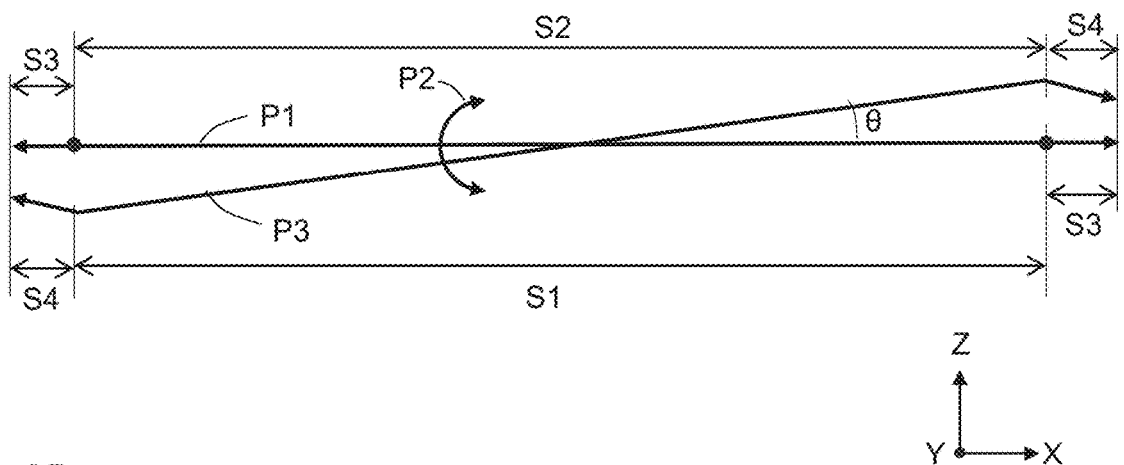
FIGS. 8A and 8B are conceptual views showing a linear path and a guide path of the moving object and the rotational movement range of the support member of Comparative examples.
Figure 8B:
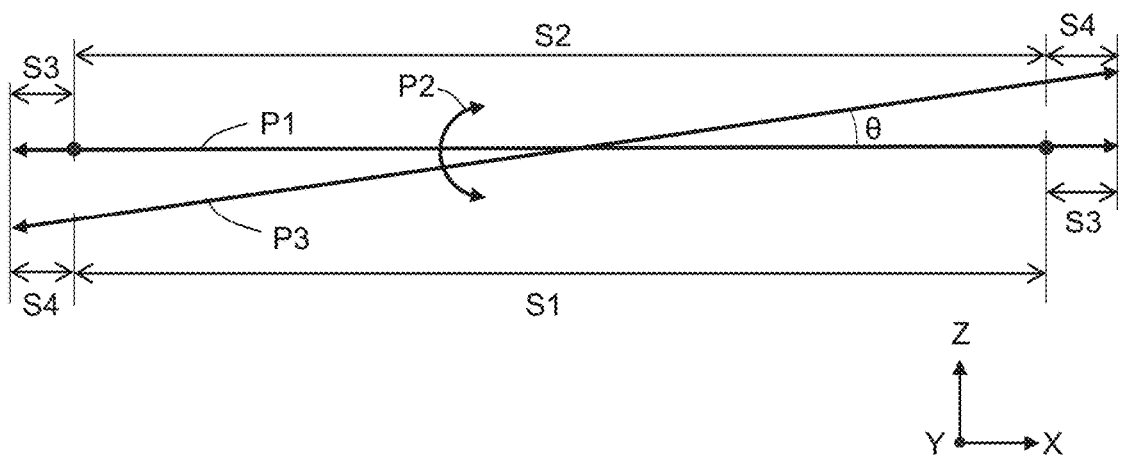

As shown in FIG. 7, additional sections S4 start at the ends of correspondence section S2 and extend in a direction parallel to linear path P1. FIG. 8A shows additional sections S4 of Comparative Example 1. Additional sections S4 start from the ends of correspondence section S2 and extend in a direction toward reference linear line C2, where reference linear line C2 is a linear line that is parallel to linear path P1 and that passes through the center of gravity or the center of guide path P3 (see FIG. 6. In FIGS. 7, 8A, and 8B, C2 coincides with P1). Moving object 2 may stop at any position in normal movement section S1, but if moving object 2 moves thereafter, the magnetic field that is applied to magnetic field detecting element 14 normally changes and the direction of movement of moving object 2 can be determined.

On the other hand, when moving object 2 moves in either direction after having stopped at the end of normal movement section S1, support member 7 can rotate in either direction. This is because first guide portion 8 must move in the direction toward reference linear line C2, and this condition holds true regardless of which direction support member 7 rotates. As a result, magnetic field generator 11 can rotate in either direction and magnetic field detecting element 14 will not be able to detect the direction of movement of moving object 2. It should be noted that this problem does not arise when moving object 2 moves in either direction after having stopped at any position other than at the ends of normal movement section S1 because, in these cases, first guide portion 8 will move only in the direction toward reference linear line C2 or in the direction away from reference linear line C2 depending on the direction of movement of moving object 2.

In the present embodiment, when moving object 2 moves from one end of normal movement section S1 to a point within normal movement section S1, the rotational position of first guide portion 8 moves from an end of rotational movement range P2 to a point within rotational movement range P2. Thus, magnetic field generator 11 rotates relative to magnetic field detecting element 14, and the magnetic field that is detected by magnetic field detecting element 14 changes. On the other hand, when moving object 2 moves from one end of normal movement section S1 to beyond normal movement section S1, support member 7 moves parallel to the X-direction along guide path P3 without rotation. When moving object 2 moves beyond normal movement section S1, the rotational position of first guide portion 8 stays at the end of rotational movement range P2. Since magnetic field generator 11 does not rotate relative to magnetic field detecting element 14, the magnetic field magnetic field that is detected by detecting element 14 remains constant.

Based on the foregoing description, when additional sections S4 and section S3 are provided, a one-to-one correspondence is realized between the rotational angle of magnetic field generator 11 and the position of moving object 2 in the X-direction within the region of rotational movement range P2 that excludes the two ends E1 and E2. Conversely, when additional sections S4 and section S3 are not provided, a one-to-one correspondence is realized between the rotational angle of magnetic field generator 11 and the position of moving object 2 in the X-direction within the region of rotational movement range P2 that includes the two ends E1 and E2. That is, a one-to-one correspondence is realized between the rotational angle of magnetic field generator 11 and the position of moving object 2 within the region of rotational movement range P2 of magnetic field generator 11 that excludes at least the two ends E1 and E2. Further, even when additional sections S4 and sections S3 are provided, whether moving object 2 moves from an end of normal movement section S1 to beyond normal movement section S1 or to a point within normal movement section S1 can be detected based on the magnetic field that is detected by magnetic field detecting element 14. Accordingly, in the present embodiment, the direction of movement of moving object 2 can be detected over the entire range of normal movement section S1 regardless of whether or not additional sections S4 and section S3 are provided.

As will be understood from FIGS. 5 to 7, magnetic field generator 11 rotates within rotational movement range P2 having two ends E1 and E2. When rotational movement range P2 of magnetic field generator 11 exceeds 180 degrees, the one-to-one correspondence mentioned above cannot be realized. On the other hand, the size of rotational movement range P2 is correlated with the resolution of stroke sensor 3, and if rotational movement range P2 is too small, the resolution of stroke sensor 3 will be impaired. Accordingly, rotational movement range P2 may be approximately 180 degrees (but no greater than 180 degrees).

FIG. 8B shows additional sections S4 of Comparative Example 2. Additional sections S4 extend in a direction away from reference linear line C2. Since the path of movement of first guide portion 8 is controlled by groove 16, first guide portion 8 cannot move in the Z-direction beyond diameter H of groove 16. Accordingly, in Comparative Example 2, when first guide portion 8 enters additional section S4, first guide portion 8 or groove 6 may suffer damage or first guide portion 8 may get jammed in groove 6. Thus, when additional sections S4 are provided, additional sections S4 may start at the ends of correspondence section S2 and extend in a direction parallel to linear path P1.

The width of groove 6 may be constant over the entire length thereof. In other words, the width of additional sections S4 may be substantially equal to the width of correspondence section S2. If the width of additional sections S4 is greater than the width of correspondence section S2, the position of first guide portion 8 in the Z-direction will become unstable in additional sections S4, and the same problem as mentioned previously may arise.

Figure 9:
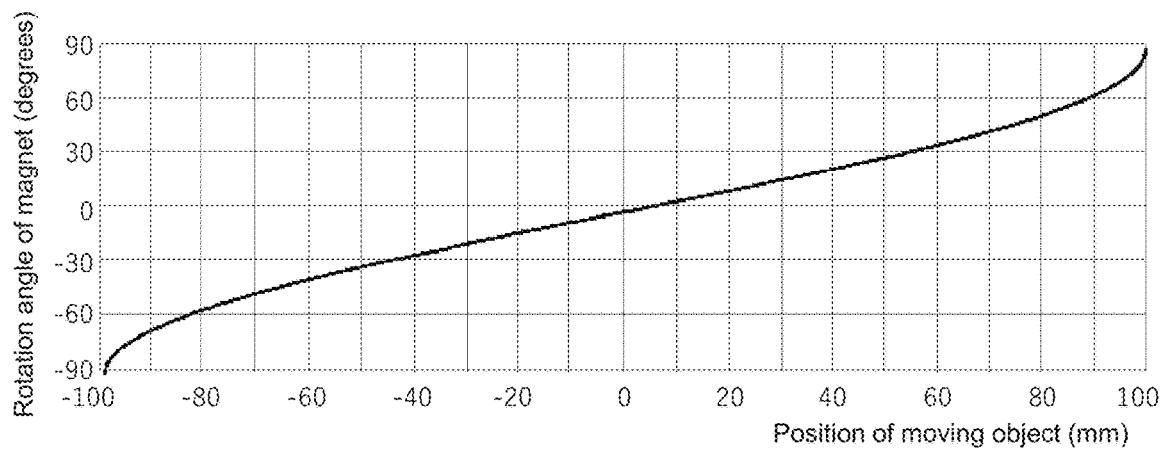
FIG. 9 is an exemplary graph showing the relationship between the position of the moving object and the output of the sensor of the stroke sensor assembly shown in FIG. 1.

FIG. 9 shows the position detection performance of stroke sensor 3 in the present embodiment, i.e., FIG. 9 shows examples of the calculation results of the relationship between the position of moving object 2 and the output of the sensor. The relationship between the position of moving object 2 and the output of the sensor was substantially linear, and good performance was obtained. It should be noted that the linearity can be improved by calibrating the output of the sensor, and as a result, slightly poor linearity of the output of the sensor is not a large problem.

Modifications

Figure 10:
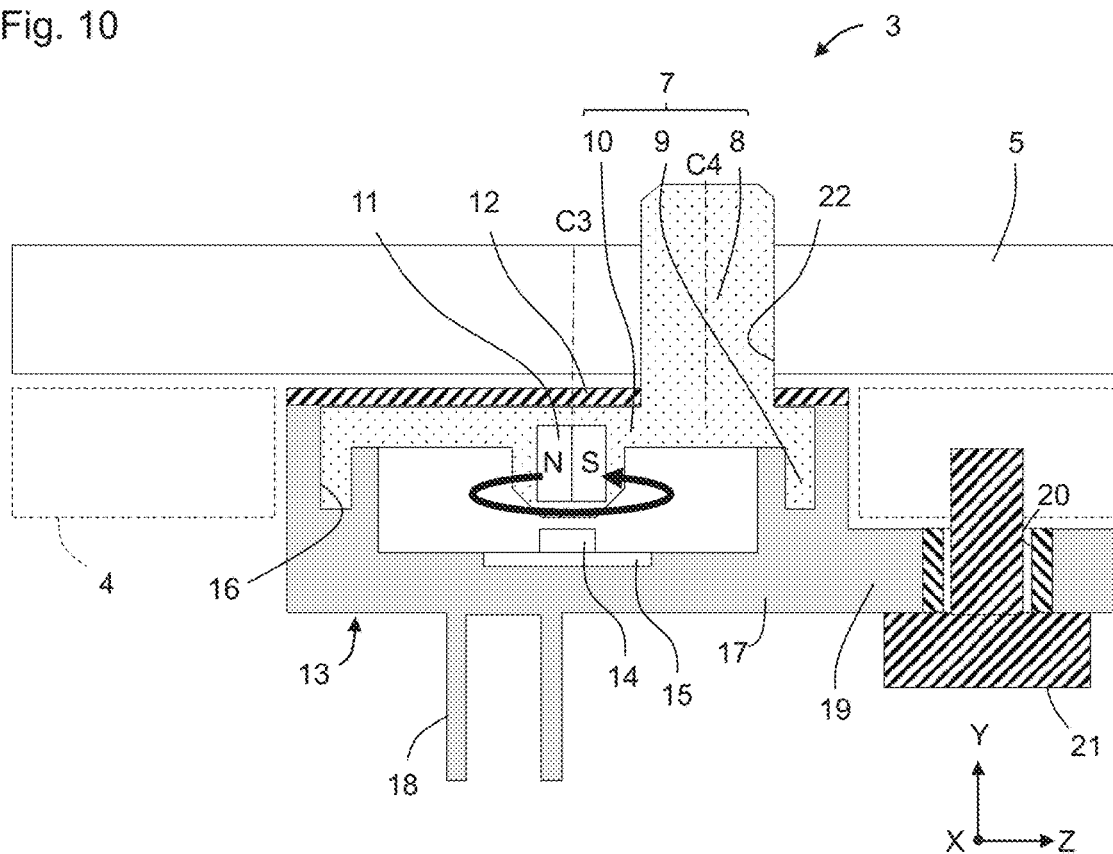
FIG. 10 is a schematic cross-sectional view of the support member and the element mounting portion of a stroke sensor assembly according to a modification of the present disclosure.

Embodiments of the present disclosure have been described, but the present disclosure is not limited to these embodiments. For example, guide path P3 is not limited to groove 6. FIG. 10 shows a modification of the present embodiment. Guide path P3 is slot 22 that penetrates through guide plate 5 in the direction of thickness thereof. Although not illustrated, an annular protrusion may be provided instead of groove 16. In this case, second guide portion 9 is a groove that engages with the protrusion. Although not illustrated, guide path P3 may be an elongated protrusion such as a rail. Alternatively, more than one guide path P3 may be provided.

Although certain preferred embodiments of the present disclosure have been shown and described in detail, it should be understood that various changes and modifications may be made without departing from the spirit or scope of the appended claims.

LIST OF REFERENCE NUMERALS 1 stroke sensor assembly
2 moving object
3 stroke sensor
6 groove
7 support member
8 first guide portion
9 second guide portion
11 magnetic field generator
13 element mounting portion
14 magnetic field detecting element
16 groove
P1 linear path
P2 rotational movement range P3 guide path
S1 normal movement section
S2 correspondence section
S4 additional section

The invention claimed is:

1. A stroke sensor for detecting a position of a moving object that moves linearly, comprising:
a magnetic field generator;
a support member that supports the magnetic field generator; and
a magnetic field detecting element that detects a magnetic field that is generated by the magnetic field generator, wherein
the support member converts a linear movement of the moving object relative to the magnetic field detecting element to a rotational movement of the magnetic field generator relative to the magnetic field detecting element, and
the magnetic field generator moves rotationally in a rotational movement range having two ends, and a one-to-one correspondence is realized between a rotation angle of the magnetic field generator and a position of the moving object within a region of the rotational movement range that excludes at least the two ends,
the moving object has a guide path that guides the support member,
the support member moves along the guide path relative to the moving object, and
the guide path is tilted with respect to a linear path along which the moving object moves.

2. The stroke sensor according to claim 1, wherein the rotational movement is a circular movement about a rotation axis that passes through the magnetic field detecting element and that is perpendicular to a magnetic field detection direction of the magnetic field detecting element.

3. The stroke sensor according to claim 1, wherein the guide path is a slot or a groove, and the support member has a first guide portion that engages with the slot or the groove.

4. The stroke sensor according to claim 1, further comprising
an element mounting portion that is provided with the magnetic field detecting element,
wherein
the element mounting portion has a groove or a protrusion for a rotational movement of the support member, and
the support member has a second guide portion that engages with the groove or the protrusion.

5. The stroke sensor according to claim 3, wherein the guide path has a correspondence section that corresponds to the rotational movement range of the magnetic field generator, and the correspondence section is linear.

6. The stroke sensor according to claim 5, wherein the guide path has at least one additional section that is connected to the correspondence section outside the correspondence section, and
the moving object makes the linear movement along a linear path, and the at least one additional section starts at an end of the correspondence section and extends in a direction parallel to the linear path.

7. The stroke sensor according to claim 6, wherein a width of the additional section is substantially equal to a width of the correspondence section.

8. The stroke sensor according to claim 1, wherein the magnetic field generator is a cylindrical magnet that is coaxial with a rotation axis of the rotational movement, wherein the magnet has only one N-pole and one S-pole about the rotation axis.

9. The stroke sensor according to claim 1, wherein the magnetic field generator has a pair of magnets that are in contact with each other, the magnets are arranged in rotational symmetry with regard to a rotation axis of the rotational movement, and surfaces of the magnets facing the magnetic field detecting element have different polarities.

10. The stroke sensor according to claim 1, wherein the magnetic field generator has a pair of magnets that are separated from each other, the magnets are arranged in rotational symmetry with regard to a rotation axis of the rotational movement, and surfaces of the magnets facing the magnetic field detecting element have different polarities.

11. A stroke sensor assembly comprising:
the stroke sensor according to claim 1; and
the moving object.

* * * * *